Aug. 7, 1945.   H. F. CLAYSON   2,381,206

LOCK NUT

Filed April 17, 1941

Harry Francis Clayson
By
Watson, Cole, Grindle & Watson
ATTYS.

Patented Aug. 7, 1945

2,381,206

UNITED STATES PATENT OFFICE 2,381,206

LOCK NUT

Harry Francis Clayson, New Lenton, Nottingham, England, assignor to Simmonds Development Corporation Limited, London, England Application April 17, 1941, Serial No. 389,087
In Great Britain April 26, 1940

3 Claims. (Cl. 151—25)

This invention relates to lock nuts and like internally screw-threaded members, hereinafter referred to as a nut, and has for its object to provide a self-locking nut which may be of all-metal construction, which may be used repeatedly and which is effectively locked to the male member on to which it is screwed, hereinafter referred to as a bolt, against unintentional relative rotary movement due to shocks, vibrations and the like, but which does not offer undue resistance when it is desired to unscrew the nut, for example by means of a wrench.

The improved lock nut according to the present invention has a nut body provided with a screw-threaded bore and a locking wire of spring metal extending through holes or slots in a part of the nut so that the part of the wire between said holes or slots extends substantially tangentially to a bolt when threaded on the nut and such part of the wire is engaged by the bolt between the threads thereof and displaced axially by the bolt, the wire being secured in the holes or slots in the nut against corresponding displacement of the wire at such holes or slots and the parts of the wire extending beyond the said holes or slots being bent into engagement with a part of the nut so that bending of the bolt engaging part of the wire when the nut is threaded on a bolt is resisted.

The locking wire is preferably so arranged that the bolt engaging part thereof is displaced both in an axial direction and in a lateral direction, i. e. in a direction transverse to the axis of the nut.

In a modified form of lock nut in accordance with the invention, one free end portion of the locking wire is securely anchored to the nut. For example, such end portion of the wire may be formed with a head preventing or substantially preventing such end portion of the wire from being drawn inwardly when the nut is screwed on to a bolt.

A plurality of locking wires may be employed to engage the threads of a bolt in the manner outlined above. For example, two wires may be provided which are adapted to engage a bolt at diametrically opposite parts thereof. In a preferred form of lock nut in accordance with the invention, there is employed a single locking wire which is of U-form with the free end portions of the wire bent to form spring arms that engage a part of the nut, the parallel arms of the wire extending through two pairs of aligned holes or slots in the nut and being adapted to engage a bolt at substantially diametrically opposite parts thereof.

The locking wire or wires may extend through holes or slots in a tubular extension of the nut body or through slots in a tubular member which is housed and secured within a tubular extension at one end of the nut body providing a recess for the unit formed by such tubular member and the locking wire or wires.

Two forms of lock nut in accordance with the invention are shown in the accompanying drawing, in which like reference numerals denote like parts and in which Figure 1 is a vertical sectional view of one form of nut, taken on the line 1—1 of Figure 2;

Figure 1:
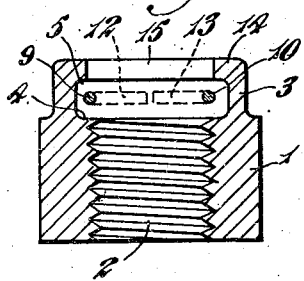
Figure 2:
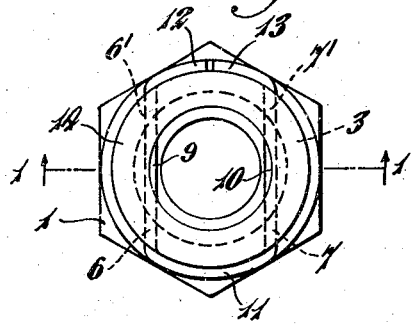
Figure 2 is a top plan view thereof.
Figure 3:
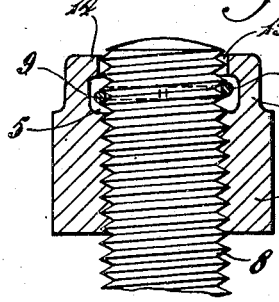
Figure 3 is a view similar to Figure 1, showing the nut screwed on to the threaded shank of a bolt.

Referring first to Figures 1 to 3 of the drawing, the lock nut comprises a nut body 1 having a screw-threaded bore 2 and having at one end thereof a tubular extension 3 of cylindrical form forming with the end face 4 of the nut body an annular recess 5 having a diameter greater than the maximum diameter of the threads of the nut body. The nut body as shown is of hexagonal form although it may be of any other desired shape, and the tubular extension 3 may be formed by turning off a hexagonal blank at one end thereof and counterboring the reduced portion of the blank. Extending through the annular wall of the tubular extension 3 are two pairs of axially aligned holes 6, 6' and 7, 7', the axes of each pair of holes extending substantially parallel one with the other and also extending substantially tangentially to the bore 2 of the nut body 1. The axis of the holes 6, 6' is spaced from the axis of the holes 7, 7' a distance approximately equal to the maximum diameter of the threads of the nut body and the said axes lie in a plane transverse to the axis of the nut body.

The locking wire, which is preferably made of spring steel, is of U-form and the parallel arms 9, 10 of the wire extend through the holes 6, 6' and 7, 7' with the bight 11 of the wire seating against the cylindrical outer wall of the tubular extension 3 and the free ends of the wire being bent towards one another into engagement with the outer wall of the said extension 3 so as to form spring arms 12, 13 and so that the whole of the locking wire lies in a plane transverse to the axis of the nut body. The wire may be circular in cross-section, as shown, and of a diameter slightly less than the pitch of the threads of the nut body, and the wire is a close fit in the holes 6, 6' and 7, 7'. The wire may, however, be of triangular or other suitable shape in cross-section. The tubular extension 3 has an inwardly extending annular flange 14 having a bore 15 preferably of a clearance diameter.

Since the bolt engaging arms 9, 10 of the locking wire are located in a plane transverse to the nut axis, at least one of such arms must be out of pitch with the crests of the threads of the nut body. Thus, when the nut is screwed on to a bolt, although one arm of the wire may mate with a thread of the bolt without being bent or displaced in an axial direction, the other arm of the wire will foul the bolt thread and will be displaced axially as the bolt advances into the nut until it engages in a groove of the bolt thread. The arms 9, 10 of the locking wire are also so spaced apart that they are bent to arcuate form in a lateral direction as they are engaged by the threads of the advancing bolt. The arms of the wire being a close fit in the holes in the tubular extension, corresponding axial and lateral displacement of the arms of the wire at such holes is prevented and since the bight 11 of the wire engages closely the outer wall of the tubular extension 3 the displacement or bending of the parallel arms 9, 10 causes an elongation of such arms and parts of the spring arms 12, 13 are drawn into the holes 6', 7'. The spring arms 12, 13, since they form a large angle with the arms 9, 10, offer a strong resistance to the elongation of such arms with the result that a very considerable tension is set up in the arms 9, 10 whereby they not only grip the bolt very firmly but also exert a pronounced axial pressure on the threads of the bolt engaged thereby so that adjacent threads of the nut and bolt are urged tightly together. There is thus achieved a very substantial locking effect which, however, is not so great as to prevent unscrewing of the nut by a wrench. When the nut is withdrawn from a bolt, the spring arms 12, 13 of the wire tend to return to their original position so that the arms 9, 10 are urged to their parallel position in a plane transverse to the nut axis and the nut may be again threaded on to a bolt and locked thereto against undesired relative rotary movement. Figure 3 shows the nut threaded on to the screw-threaded shank 8 of a bolt with the arms 9, 10 displaced both axially and laterally. The nut may, if desired, be threaded on to a bolt from the end thereof adjacent the locking wire, whilst a plurality of U-shaped locking wires operating in the manner described above may be secured to a tubular extension of the nut body. It will be understood that the locking wire may extend through slots instead of holes in the tubular extension of the nut body, such slots being of such shape and size as to prevent axial and lateral displacement of the wire at such slots.

Figure 6:
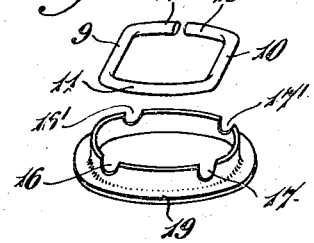
Figure 6 is an exploded perspective view of the locking wire unit shown in Figures 4 and 5.
Figure 4:
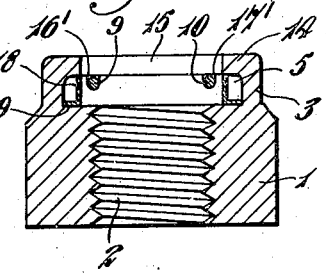
Figure 4 is a vertical sectional view of another form of nut, taken on the line 4—4 of Figure 5.
Figure 5:
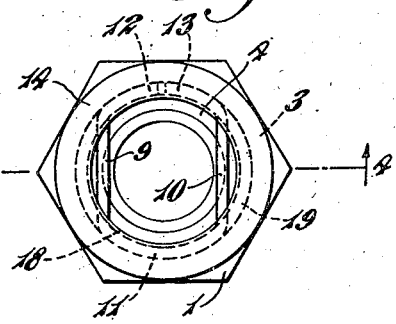
Figure 5 is a top plan view of the nut shown in Figure 4.

Figures 4 to 6 show a modified constructional form which is similar in operation to that described with reference to Figures 1 to 3 but which avoids the provision of holes or slots in the tubular extension of the nut body. In this modified form of lock nut, the parallel arms 9, 10 of the U-shaped locking wire extend through two pairs of axially aligned slots 16, 16' and 17, 17' in a short tubular member 18 of cylindrical form, the bight 11 of the wire and the spring arms 12, 13 conforming to the contour of the outer wall of the tubular member 18. The tubular member 18 has an outwardly extending annular flange 19 at the lower end thereof which fits the annular recess 5 in the tubular extension 3 of the nut body 1, the said slots 16, 16', 17 and 17' being open to the upper end of the tubular member. The tubular member 18 and the locking wire form a unit which is inserted in the recess 5 in the tubular extension of the nut body and secured therein by the inturned portion 14 of such tubular extension, the inturned portion 14 also serving to close the slots in the tubular member 18. The locking wire, as shown in Figure 4, is a close fit in the slots in the tubular member so that the wire at such slots is secured therein against relative axial and lateral displacement of the wire at such slots. It will be understood that the general disposition and action of the locking wire in this modified form of lock nut is similar to that of the lock nut described with reference to Figures 1 to 3 and that, when this modified form of lock nut is threaded on to a bolt, the locking wire is displaced both axially and laterally against the resistance to such displacement imposed by the spring arms 12, 13, thereby securely locking the nut to the bolt against unintentional relative rotary movement.

The engagement of the upper edge of the tubular member 18 by the inturned flange 14 of the tubular extension 3 serves to prevent relative rotary movement between the tubular member 18 and the nut body 1 when the nut is screwed on to a bolt. If desired, however, other means may be employed to prevent such relative movement.

Figure 7:
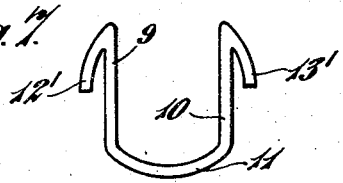
Figure 7 is a plan view of a modified form of locking wire.

In general, the more the free ends of the wire are bent from the parallel arms, the greater will be the degree of locking obtained. Thus the ends of the wire may be bent away from one another to form, for example, a locking wire of the general form shown in Figure 7, in which the spring arms 12', 13' have been bent through approximately 150°.

Figure 8:
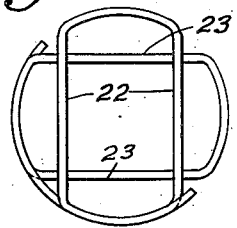
Figure 8 is a plan view of a further modification of a locking wire.

It will be understood that the invention is not limited to a lock nut having a locking wire of the forms described and that the locking wire may take other forms. For example, the locking wire may be formed as shown in Figure 8, so as to comprise a plurality of convolutions providing a plurality of pairs 22, 23 of bolt engaging arms, and such pairs of arms may extend through two or more pairs of slots in a tubular member housed within a recess in a tubular extension of the nut body, as in Figures 4 to 6, or through holes in the tubular extension itself, as in Figures 1 and 2.

I claim:

1. A lock nut having a threaded body portion and an unthreaded part, said unthreaded part having openings therethrough, a resilient U-shaped wire extending through said openings so that the bight of the U will closely engage the unthreaded part and the interior portion of the wire will be disposed to resiliently engage the threads of a cooperating bolt, the ends of said wire externally of said unthreaded part being bent back against the nut to maintain the resilient engagement.

2. A nut as claimed in claim 1 in which the U-shaped locking element defines a plane perpendicular to the bolt axis.

3. A nut as claimed in claim 1 in which the interior portions of the wire are so disposed axially as to be out of phase with the bolt threads.

HARRY FRANCIS CLAYSON.